United States Patent [19]

Oonuma et al.

[11] 4,006,647
[45] Feb. 8, 1977

[54] IMPACT ENERGY ABSORBING APPARATUS

[75] Inventors: Toshio Oonuma; Yutaka Tanaka, both of Aichi, Japan

[73] Assignee: Toyota Jidosha Kogyo Kabushiki Kaisha, Aichi, Japan

[22] Filed: Aug. 12, 1975

[21] Appl. No.: 603,809

[30] Foreign Application Priority Data

Aug. 29, 1974 Japan .................. 49-99160

[52] U.S. Cl. ........................... 74/492; 188/1 C
[51] Int. Cl.² ........................................ B62D 1/18
[58] Field of Search .............. 74/492, 493; 188/1 C

[56] References Cited

UNITED STATES PATENTS

| | | | |
|---|---|---|---|
| 3,392,599 | 7/1968 | White | 74/492 |
| 3,538,783 | 11/1970 | Butts | 74/492 |
| 3,538,785 | 11/1970 | Grancon | 74/492 |
| 3,590,655 | 7/1971 | Farrell | 74/492 |
| 3,748,922 | 7/1973 | Farrell | 74/492 |
| 3,788,148 | 1/1974 | Connell et al. | 74/492 |

*Primary Examiner*—Allan D. Herrmann
*Attorney, Agent, or Firm*—Stevens, Davis, Miller & Mosher

[57] ABSTRACT

An impact energy absorbing apparatus having two cylinders coupled for telescopic movement under impact axially applied thereto. In addition to rigid balls press-fitted between the cylinders, the apparatus has idle rigid balls snugly fitted therebetween which are to be conducted for rolling movement along respective guide grooves of certain length formed on the cylinder. The characteristic of load-stroke relationship is thereby improved to provide optimum efficiency of impact absorption.

9 Claims, 7 Drawing Figures

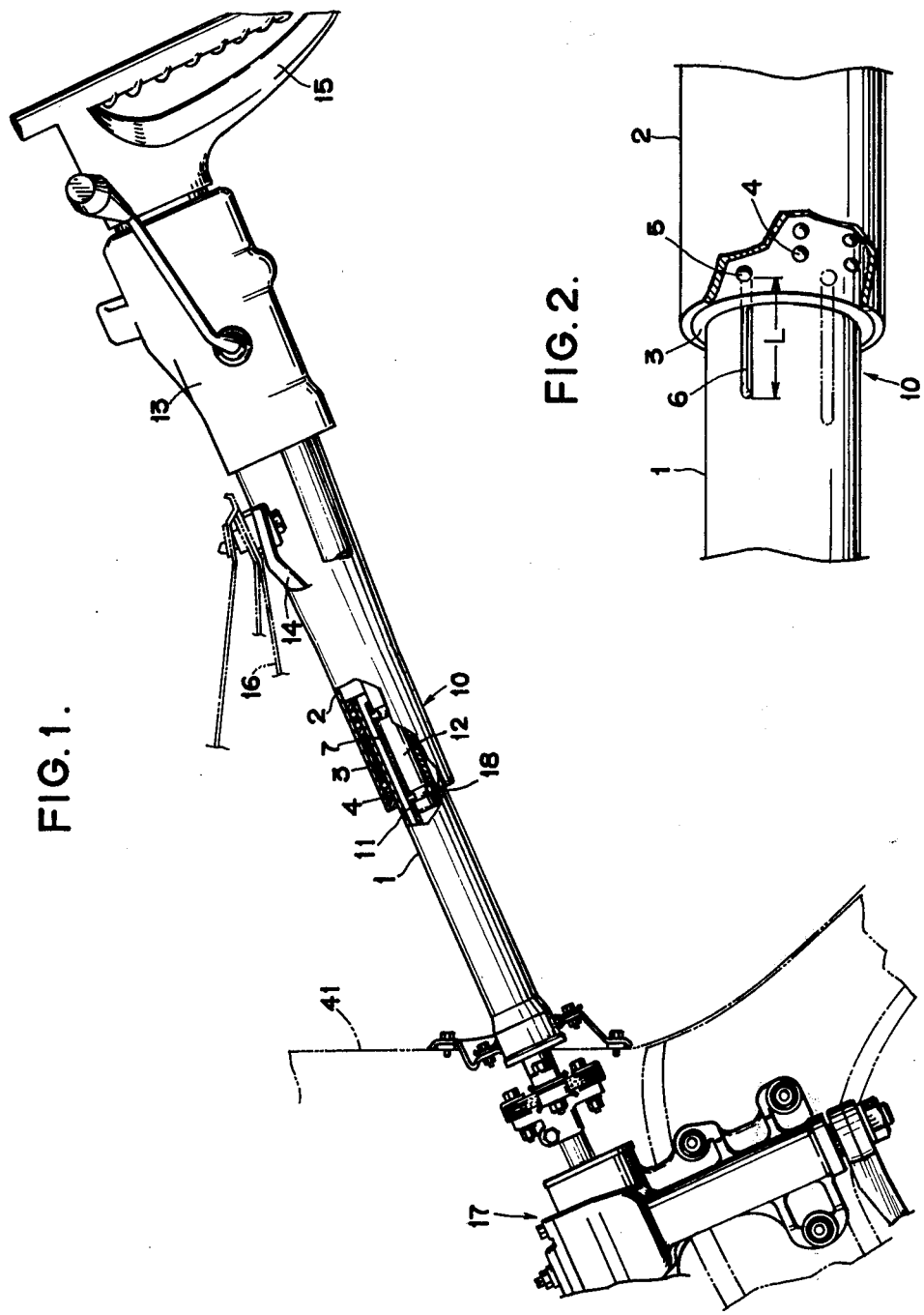

IMPACT ENERGY ABSORBING APPARATUS

BACKGROUND OF THE INVENTION

This invention generally relates to an impact energy absorbing apparatus in the form of two telescoped cylindrical members subject to axial impact, and more particularly to an improved steering column assembly for use in vehicles.

With the latest tendency toward ever increasing speed-up of motor vehicles the problem of safeguarding a vehicle driver against collision accidents has become more and more serious. On the occasion of collision, the driver bends forward due to inertia to strike his breast against the manual steering wheel thus being wounded seriously or otherwise. In this view, therefore, it has been conventional to arrange in the vehicle steering column assembly that both of an inner steering shaft assembly connected to the manual steering wheel and an outer supporting mast jacket or cylindrical post assembly be adapted for telescopic movement in the axial direction for absorption of shock energy axially applied thereto. As is commonly known, the most typical design is that the outer supporting post assembly is made up of two post sections adapted for telescopic engagement with each other with shock absorbing elements interposed therebetween. For example, an impact energy absorbing apparatus disclosed in a Japenese Patent Serial No. 35527/71 employs rolling spherical elements or rigid balls press-fitted in and between two telescopically engaged posts so that when the posts effect axial relative movement under impact applied thereto, the rigid balls cause localized plastic deformation of the wall surfaces of the posts along their rolling paths.

However, such prior art impact absorbing apparatus still has had difficulty with respect of securing a full extent of safeguard against collision accidents. Namely, when the outer supporting post of the steering column assembly starts its movement of telescopic contraction under an impact load axially forwardly applied thereto, or at the time of the steering column assembly commencing its shock absorbing stroke, there generally will occur a significantly high magnitude of initial load that in addition to a load to the impact absorbing elements of rigid balls, includes those to rupture shear pins ordinarily used in a steering shaft, a breakaway bracket capsule, etc., a load of inertia due to moving masses, and other possible loads. To hold down this high magnitude of initial load, therefore, the shock absorbing characteristic of the apparatus has to be lowered so that further loads to be absorbed by the apparatus will be abruptly decreased. Thus, the efficiency of impact absorption attainable is deteriorated.

SUMMARY OF THE INVENTION

The invention has an object to solve the above described prior art problems by providing an impact energy absorbing apparatus of the type specified which attains an improved efficiency of impact absorption. Another object is to provide such apparatus which attains optimum characteristics of load-stroke relationship by effecting absorption of a given impact energy in a multistage manner without occurrence of an initial peak load.

To accomplish these objects, the invention provides an impact energy absorbing apparatus comprising two cylindrical members connected for telescopic movement relative to each other under axial impact applied thereto, and rolling elements press-fitted between said cylindrical members at the telescoped connection, characterized by the provision of at least one guide means which is formed on at least one of said cylindrical members as axially extending over a predetermined length from the telescoped connection, and at least one idle rolling element which is snugly inserted in said guide means at the telescoped connection of the cylindrical members. The invention will now be described in its preferred embodiment by referring to the accompanying drawings wherein the invention is applied for example to a vehicle steering column system.

BRIEF DESCRIPTION OF THE DRAWINGS

FIG. 1 is a schematic perspective side view, partly broken, of a vehicle steering system incorporating the invention;

FIG. 2 is a schematic perspective view, partly broken, of an impact energy absorbing apparatus according to the invention;

DESCRIPTION OF THE PREFERRED EMBODIMENT

Figure 3:
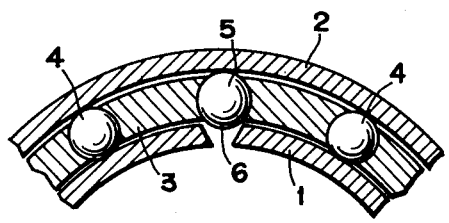
FIGS. 3, 4 and 5 are cross sectional views showing how the invention is differently practiced.

As shown in FIG. 1, the vehicle steering column assembly incorporating the invention conventionally includes; a steering shaft assembly generally indicated at 7 connecting operatively between an interior manual steering wheel 15 and a vehicle stearing gear box 17; an outer supporting post assembly generally indicated at 10; a steering column cover 13; and a breakaway bracket 14 for normally securing the post assembly in connection to the fire wall structure 41 of the vehicle body via a pedal bracket 16. Also, as conventional, the inner steering shaft assembly 7 is made up of two telescoped shaft sections 11 and 12 normally restrained of their relative axial movement by means of shear pins 18. Also, the outer supporting post assembly 10 encircling the shaft assembly 7 is made up of two telescoped post sections, viz. one post 1 of smaller diameter and the other post 2 of larger diameter.

As shown in FIGS. 2, 3, 4 and 5, rigid ball members or rolling elements 4 are press-fitted in and between the two telescoped post sections 1 and 2, which rolling elements 4 being held in position by a retaining cage 3, in such manner that they are positioned in annular rows and substantially equi-spaced in each row. Further, as best shown in FIG. 2, one of the two posts, the diametrically smaller post 1 in this case, is formed on the outer surface with a guide means 6 in the form of a recessed groove for example of a certain length L axially extending out of the telescoped range of the two posts. An idle rigid ball or rolling element 5 also held in position by the cage 3 and in registration with the guide groove 6, is inserted snugly between the two posts 1 and 2. The extent of this snug fit is such that the element is substantially free to turn or roll on between the posts with no influence of load at all or very small ones, if any, upon the contiguous wall surfaces of the posts. Further, the idle rolling element 5 is positioned ahead of the posts with the ball cage of the previously mentioned elements 4, as shown, so that when assembling, the circumferential positioning of the guide groove relative to the post 2 is made easily and reliable.

Figure 6:
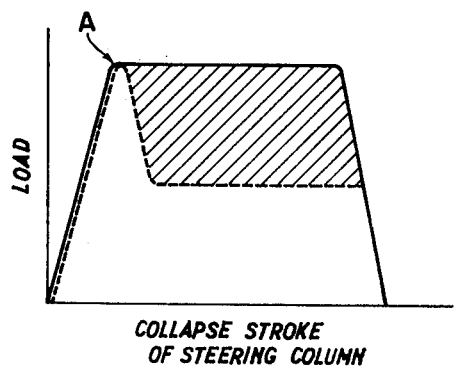
FIG. 6 is a graphic representation of characteristics of load-stroke relationship under impact.
Figure 7:
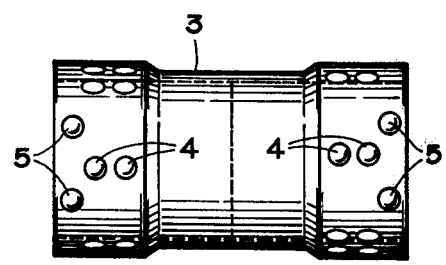
FIG. 7 is a side view of a cage for retaining rolling elements.

Now, the impact energy absorbing apparatus of the invention will be operated as follows. When an axially directed impact load is applied to the outer supporting post assembly 10, the diametrically larger post 2 starts telescopic movement upon and along the post 1, so that the pressed-in rigid rolling elements 4 rotatingly roll on causing localized plastic deformation of the outer surface of the post 1 or the inner surface of the post 2 while forming traces of depression marks on the surfaces. In this instance, the magnitude of load to be absorbed is remarkably high, as shown at a point A of FIG. 6, because of the fact that in addition to the load shared by the rolling elements 4, those by the rupture of the shear pins in the steering shaft assembly 7 and breakaway steering bracket capsule, and that by the inertia of the moving masses, etc. are summed up. In the meantime, the idle rolling element 5 carried by the retainer cage 3 rolls on along the guide groove 6 while keeping almost no contact with the adjacent wall surfaces of the posts 1 and 2 or very slight contact therewith only having a minor load influence thereon. However, when the relative movement of the two posts exceeds the stroke length L, the idle rolling element 5 is forced to ride over the outer cylindrical surface of the post 1, then rolling on now as pressed between the two posts similarly of the elements 4 to from a trace of depression marks on the outer surface of the post 1 or the inner surface of the post 2. Thus, an additional absorption of shock load is effectuated by the idle rolling element 5. It is to be noted that the length of L is so selected in design that the absorption of load by the idle rolling element 5 begins just when the initial impact load to be absorbed by the rupture of the shear pins in the steering shaft assembly 7, etc. disappear. By the favor of this featured action of load absorption by the idle rolling element 5, it is possible to maintain the initial load of high magnitude throughout the entire shock absorbing stage. In consequence, the attainable characteristic of load-stroke in the impact energy absorbing apparatus of the invention will be improved as shown by solid line in FIG. 6. In this Figure, the curve shown by dotted line represents characteristics of a prior art apparatus employing only the rolling elements 4 wherein there occurs a high load at the beginning of impact or at the time of starting the post stroke movement, however followed by a rapid decrease of load hence the energy absorbing efficiency being deteriorated.

Although the invention has so far been described as incorporating a single idle rolling element 5, a plurality of such rolling elements having rigidity greater than the posts may alternatively be employed together with corresponding guide grooves 6, depending on the requirements of maintaining the previously mentioned initial load. It is also possible, as shown by phantom line in FIG. 2, to provide an additional guide groove or grooves of different length so that the load absorption be more efficiently attainable in a multistage manner.

Figure 4:
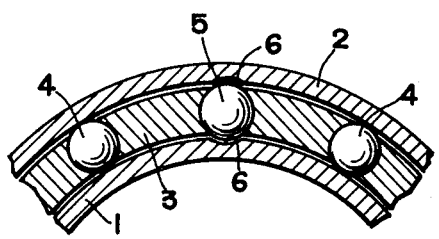
Figure 5:
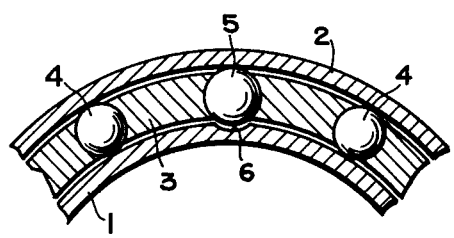

FIGS. 3, 4 and 5 respectively show how the guide means are practically formed on the posts. As shown in FIG. 3, the guide means 6 may be in the form of a slit-like opening formed on the post 1, while two guide means 6 may be formed respectively on the outer surface of the post 1 and inner surface of the post 2 as shown in FIG. 4.

The foregoing description has been made as the invention being applied to the vehicle steering column assembly, however it has to be noted that the invention is in no way limited to this particular field of application, and is useful to any other impact absorbing purposes where a telescopic mechanism subject to axial impact is involved.

We claim:

1. An impact energy absorbing apparatus comprising:
   two cylindrical post members connected for telescopic movement relative to each other under axial impact applied thereto;
   first rolling elements press fitted between said cylindrical post members at the telescoped connection and arranged in at least one annular row;
   at least one idle second rolling element snugly positioned between said cylindrical post members at the telescoped connection;
   a cage member between said cylindrical post members at the telescoped connection for retaining said first rolling elements and said at least one second rolling element therein;
   at least one axially extending guide means of predetermined axial length defined in at least one of said cylindrical post members, said guide means extending axially from the telescoped connection; and
   said at least one idle second rolling element being snugly received in said guide means and being axially spaced from all of said first rolling elements.

2. An impact energy absorbing apparatus according to claim 1 wherein the guide means is a groove formed on at least one of the cylindrical members.

3. An impact energy absorbing apparatus according to claim 1 wherein the guide means is a slit opening formed on at least one of the cylindrical members.

4. An impact energy absorbing apparatus according to claim 1 further comprising: more than one guide means, and the guide means are of a length different from each other.

5. In a vehicle steering system including a telescopic steering shaft operatively connected between a steering gear and a manual steering wheel, an impact energy absorbing apparatus comprising:
   two cylindrical post members connected for telescopic movement relative to each other under axial impact applied thereto and disposed around the inner steering shaft between the steering gear and the manual steering wheel;
   first rolling elements press fitted between said cylindrical post members at the telescoped connection and arranged in at least one annular row;
   at least one idle second rolling element snugly positioned between said cylindrical post members at the telescoped connection;
   a cage member between said cylindrical post members at the telescoped connection for retaining said first rolling elements and said at least one second rolling element therein;
   at least one axially extending guide means of predetermined axial length defined in at least one of said cylindrical post members, said guide means extending axially from the telescoped connection; and
   said at least one idle second rolling element being snugly received in said guide means and being axially spaced from all of said first rolling elements.

6. In a vehicle steering system according to claim 5 wherein the guide means is a groove formed on at least one of the cylindrical members.

7. In a vehicle steering system according to claim 5 wherein the guide means is a slit opening formed on at least one of the cylindrical members.

8. In a vehicle steering system according to claim 5 further comprising: more than one guide means, and the guide means are of a length different from each other.

9. In a vehicle steering system according to claim 5, wherein:
said at least one idle second rolling element is closer to the steering gear than all of said first rolling elements.

* * * * *